(12) United States Patent
Chapman et al.

(10) Patent No.: US 11,620,428 B1
(45) Date of Patent: *Apr. 4, 2023

(54) POST-CTS CLOCK TREE RESTRUCTURING

(71) Applicant: Cadence Design Systems, Inc., San Jose, CA (US)

(72) Inventors: Andrew Mark Chapman, Milton (GB); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 17/315,019

(22) Filed: May 7, 2021

(51) Int. Cl.
| | |
|---|---|
| *G06F 30/396* | (2020.01) |
| *G06F 30/367* | (2020.01) |
| *G06F 30/337* | (2020.01) |
| *G06F 30/3312* | (2020.01) |
| *G06F 117/04* | (2020.01) |
| *G06F 119/12* | (2020.01) |
| *G06F 117/10* | (2020.01) |

(52) U.S. Cl.
CPC .......... *G06F 30/396* (2020.01); *G06F 30/337* (2020.01); *G06F 30/3312* (2020.01); *G06F 30/367* (2020.01); *G06F 2117/04* (2020.01); *G06F 2117/10* (2020.01); *G06F 2119/12* (2020.01)

(58) Field of Classification Search
CPC .... G06F 30/396; G06F 30/367; G06F 30/337; G06F 30/3312; G06F 2117/10; G06F 2117/04; G06F 2119/12
USPC ........... 716/113, 114, 108, 122, 134; 703/16
See application file for complete search history.

(56) References Cited

U.S. PATENT DOCUMENTS

| | | | | |
|---|---|---|---|---|
| 6,367,060 | B1* | 4/2002 | Cheng ................... | G06F 30/327 716/122 |
| 6,429,714 | B1* | 8/2002 | Schultz ..................... | G06F 1/10 327/161 |
| 6,440,780 | B1* | 8/2002 | Kimura ................. | G06F 30/327 438/129 |
| 6,536,024 | B1* | 3/2003 | Hathaway ................. | G06F 1/10 327/295 |
| 6,698,006 | B1* | 2/2004 | Srinivasan .............. | G06F 30/39 716/122 |
| 6,754,877 | B1* | 6/2004 | Srinivasan .............. | G06F 30/39 716/134 |

(Continued)

OTHER PUBLICATIONS

Guo et al., Chinese Patent Document No. CN-110825210-A, published Feb. 21, 2020, abstract and 1 drawing. (Year: 2020).*

*Primary Examiner* — Phallaka Kik
(74) *Attorney, Agent, or Firm* — Schwegman Lundberg & Woessner, P.A.

(57) ABSTRACT

Various embodiments provide a system for performing operations that comprise accessing an integrated circuit design that includes a clock tree interconnecting a clock source to a plurality of clock sinks. The operations include receiving a request to adjust a present timing offset of the clock tree to a target timing offset. In response, a group of clock sinks to be adjusted are identified to satisfy the request. The clock tree is then modified by moving a terminal of the group from a first location in the clock tree to a second location in the clock tree to update the clock tree. An indication is provided that the updated clock tree has been modified and complies with the target timing offset.

20 Claims, 10 Drawing Sheets

(56) References Cited

U.S. PATENT DOCUMENTS

| | | | | |
|---|---|---|---|---|
| 8,635,579 B1* | 1/2014 | Cao | G06F 30/30 | 716/108 |
| 8,839,178 B1* | 9/2014 | Walsh | G06F 30/398 | 716/108 |
| 10,042,971 B1* | 8/2018 | Eslami Dehkordi | G06F 30/394 | |
| 10,068,048 B1* | 9/2018 | Eslami Dehkordi | G06F 30/398 | |
| 10,146,897 B1* | 12/2018 | Sunder | G06F 30/398 | |
| 10,282,506 B1* | 5/2019 | Meyer | G06F 1/10 | |
| 11,354,479 B1* | 6/2022 | Chapman | G06F 30/396 | |
| 2001/0025368 A1* | 9/2001 | Cooke | G06F 1/10 | 716/124 |
| 2003/0182634 A1* | 9/2003 | Chang | G06F 1/10 | 716/114 |
| 2005/0258881 A1* | 11/2005 | Schultz | G06F 1/10 | 327/161 |
| 2006/0190899 A1* | 8/2006 | Migatz | G06F 30/39 | 716/114 |
| 2007/0016884 A1* | 1/2007 | Nishimaru | G06F 30/30 | 716/124 |
| 2009/0217225 A1* | 8/2009 | Sunder | G06F 1/10 | 716/113 |
| 2010/0066424 A1* | 3/2010 | Nakatani | G06F 1/12 | 327/237 |
| 2012/0240091 A1* | 9/2012 | Sunder | G06F 1/10 | 716/113 |
| 2013/0111425 A1* | 5/2013 | Kumar | G06F 30/327 | 716/108 |
| 2013/0219352 A1* | 8/2013 | Ishikawa | G06F 30/30 | 716/108 |
| 2013/0305078 A1* | 11/2013 | Lee | G06F 1/08 | 713/500 |
| 2015/0213186 A1* | 7/2015 | Le Bars | G06F 30/3312 | 716/114 |
| 2016/0203251 A1* | 7/2016 | Sunder | G06F 1/10 | 716/113 |
| 2018/0144086 A1* | 5/2018 | Chung | H01L 23/5286 | |
| 2019/0361486 A1* | 11/2019 | Malik | G06F 30/39 | |
| 2021/0341962 A1* | 11/2021 | Wu | G06F 1/10 | |
| 2022/0216860 A1* | 7/2022 | Kimura | G06F 1/10 | |

* cited by examiner

802

804 — ACCESS INTEGRATED CIRCUIT DESIGN INCLUDING CLOCK TREE

806 — RECEIVE REQUEST TO ADJUST TIMING OFFSET

808 — IDENTIFY GROUP OF CLOCK SINKS TO BE ADJUSTED

810 — MODIFY CLOCK TREE

812 — PROVIDE INDICATION CLOCK TREE HAS BEEN MODIFIED

FIG. 8

POST-CTS CLOCK TREE RESTRUCTURING

TECHNICAL FIELD

The present disclosure generally relates to the technical field of integrated circuit design. In particular, the present disclosure addresses systems and methods for performing post-dock tree synthesis (CTS) restructuring.

BACKGROUND

An integrated circuit (IC) layout specifies portions of various components of an IC. When the IC is to include a large number of registers, latches, flip-flops and/or other types of docked devices ("sinks") that are to be clocked by one or more clocks, the IC must include one or more clock trees for delivering the clock signal from the clock source to all of the sinks to be clocked by it. A clock tree distributes a clock signal from its root to a set of sinks within an IC through a branching network of drivers (e.g., buffers or inverters). A single driver distributes the clock signal to a grouping of other drivers and/or sinks. Connectivity between a driver and its fanout is represented by a "clock net" and will be physically implemented by routed wires.

BRIEF DESCRIPTION OF THE SEVERAL VIEWS OF THE DRAWINGS

Various ones of the appended drawings merely illustrate example embodiments of the present inventive subject matter and cannot be considered as limiting its scope.

FIGS. 8-9 are flowcharts illustrating example methods for clock tree restructuring after Clock Tree Synthesis (CTS) in accordance with some embodiments.

DETAILED DESCRIPTION

Figure 1:
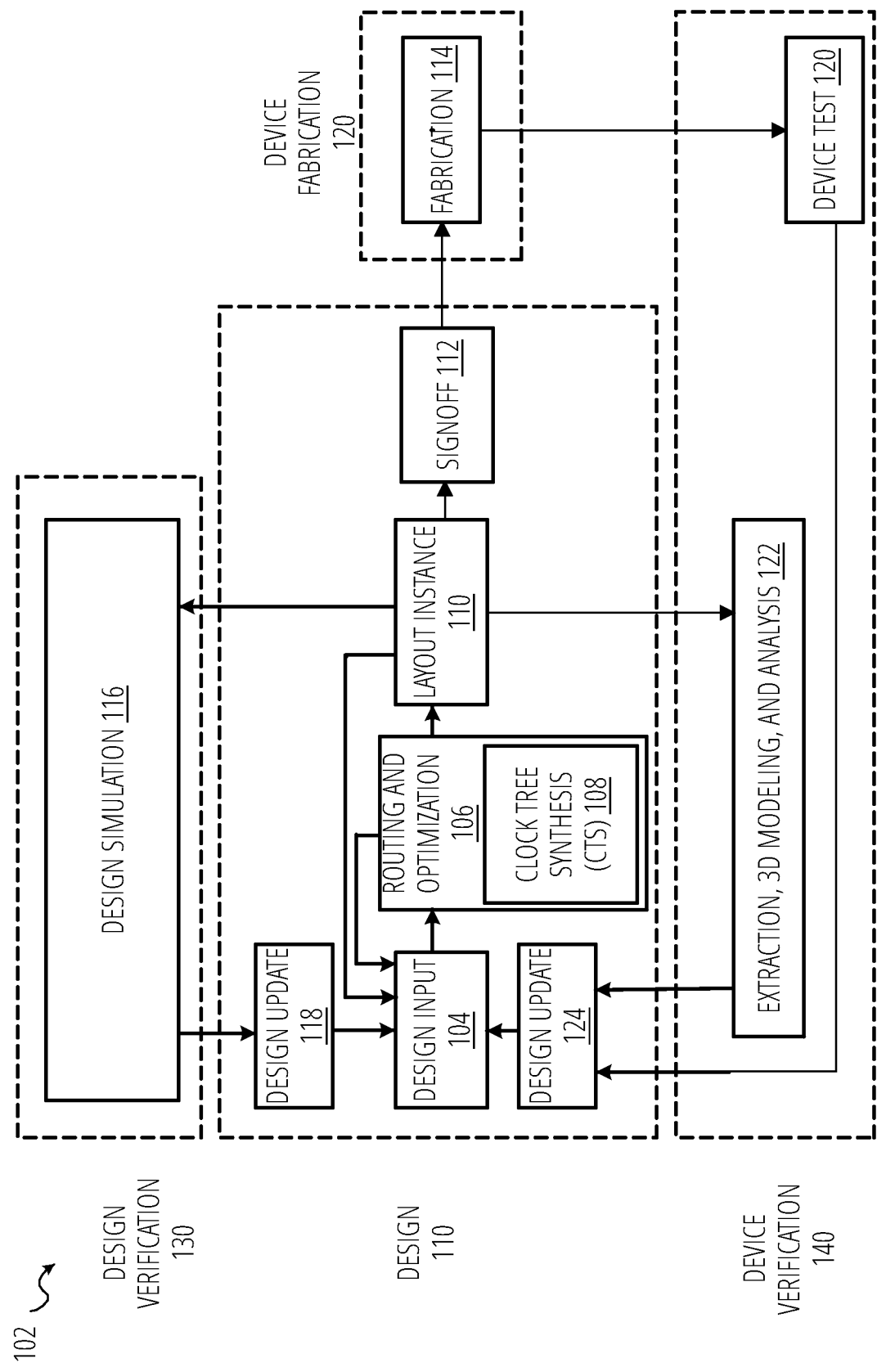
FIG. 1 is a diagram illustrating an example design process flow that includes post-CTS clock-tree restructuring in accordance with some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Electronic design automation (EDA) software systems commonly perform clock-tree synthesis (CTS). Conventional approaches to CTS typically include a labor-intensive process that generates a mapping of clock signals to each sequential element within a design. Generally, buffers and inverters are inserted along a clock path to achieve minimum skew. For ICs, a clock may consume approximately half of the total power consumption and as such, processes that reduce power consumption for optimized clock trees help reduce the total power cost.

Traditional techniques for restructuring a clock tree after CTS are nonexistent. Aspects of the present disclosure address this problem, among others, with systems and methods for clock tree restructuring after, or post, CTS. By providing solutions that target reduction of delay for specific groups of clock sinks, clock skew reduction can be achieved for various portions of a clock tree that result in a significant delay time improvement as well as power reduction for the entire IC. By exercising the solutions described herein, delay time reduction is achieved without needing to perform a time and resource intensive generation of a new clock tree via CTS. However, conventional CTS do not provide opportunities to adjust the delay placements within the clock tree after CTS has completed.

As such, systems and methods for adjusting skew times after CTS has completed is a desired. Adding delays after CTS has completed may include solutions such as inserting delaying buffers above individual sinks or groups of sinks. However, reducing delay times is much more complicated.

Small delay reductions can be implemented through changing the sizing of buffers, but it is difficult to and impracticable to target individual sinks. Large delay reductions require fewer stages of buffering elements between the clock source and the clock sinks. Both large and targeted delay reductions are difficult to perform after CTS (e.g., post CTS) as both require a different clock tree structure. As the CTS generates a clock network in a holistic manner, any restructuring after the generation of the clock tree can impact other components of the clock tree.

Conventional approaches to reducing skew (reducing delay) within clock trees include addressing such request prior to or during CTS. After CTS, adding additional requests for reduction in delays or targeted changes is unavailable.

The methods and systems described herein provide the ability to significantly reduce the delay to select clock sinks even after CTS. The reduction in delay can be generated through a user interface (e.g., graphical user interface (GUI)) or automatically generated. A system disclosed and described herein includes memory storing instructions that, when executed by the one or more processors, cause the system to perform operations. The operations include accessing an integrated circuit design stored in the memory. The integrated circuit design includes a clock tree that includes routes that interconnect a clock source to a plurality of clock sinks. The operations include receiving a request to adjust a present timing offset of the clock tree to a target timing offset. Based on the received request, the system identifies a group of clock sinks from the clock tree to be adjusted to satisfy the request. The operations further include restructuring, or modifying the clock tree by moving a terminal of the group from a first location in the clock tree to a second location in the clock tree to generate an updated clock tree. The operations further include providing an indication that the updated clock tree has been generated and complies with the target timing offset.

In accordance with some embodiments, moving the terminal of the group from the first location in the clock tree to a second location in the clock tree advances the group of clock sinks to the second location in the clock tree. The second location in the clock tree is at a location closer to the clock source than the first location and provides a reduction in clock skew (delay).

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, traditional techniques for clock tree restructuring include performing delay reduction requests before or during CTS, not after CTS has completed. Aspects of the present disclosure address this problem, among others, with systems and methods for post-CTS clock tree restructuring that include adjusting clock sinks to attain a timing target with a reduction in delay. By selecting groups of clock sinks and making necessary adjustments to the clock tree to achieve the desired timing target, a new level of granularity in IC design as well as a higher level in design freedom can be attained.

In accordance with some embodiments, clock sinks are grouped together with respect to either physical proximity within the clock tree within a specified radius, logical and/or electrical equivalence; and/or a similar targeted delay offset. As part of this process, the pin from which connectivity change (e.g., clock tree restructuring/modification) occurs is identified. In some embodiments, the pin is the clock sink pin or an input pin of a buffer/inverter that drives the selected group of clock sinks. In some embodiments, the pin is an input pin of a new instance created from cloning an existing instance. After identifying the pin, a new location or reassignment location is identified. For requests for delay reductions in the clock tree, the clock sinks will be relocated to a higher node in the clock tree, closer to the clock signal than where the group of clock sinks had been assigned based on the generation during CTS. After identifying the new location, any compensation for electrical changes resulting from the reassignment is calculated to determine if the relocation is a viable solution. If so, the reassignment is processed and neighboring instances from the first location and the new location are moved/resized to adjust for load increases and decreases within the clock tree.

The various operations of example methods described herein may be performed, at least partially, by one or more processors that are temporarily configured (e.g., by software) permanently configured to perform the relevant operations. Similarly; the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

FIG. 1 is a diagram illustrating an example design process flow that includes post-CTS clock-tree restructuring in accordance with some embodiments. The term "restructuring" and "modifying" are used interchangeable herein and is understood to mean an update is being made to the clock tree as described. As shown, the design process flow 102 includes a design phase 110, a device fabrication phase 120, a design verification phase 130, and a device verification phase 140. The design phase 110 involves an initial design input 104 operation where the basic elements and functionality of a device are determined, as well as revisions based on various analyses and optimization of a circuit design. This design input 104 operation is where block instances are used in the circuit design and any additional circuitry for the design around the blocks is selected. The initial strategy, tactics, and context for the device to be created are also generated in the design input 104 operation, depending on the particular design algorithm to be used.

In some embodiments, following an initial selection of design values in the design input 104 operation, routing, timing analysis, and optimization are performed in a routing and optimization 106 operation, along with any other automated design processes. While the design process flow 102 shows optimization 106 occurring prior to a layout instance 110, routing, timing analysis, and optimization 106 may be performed at any time to verify operation of a circuit design. For instance, in various embodiments, timing analysis in a circuit design may be performed prior to routing of connections in the circuit design, after routing, during register transfer level (RTL) operations, or as part of a signoff 112.

As shown, the routing and optimization 106 operation includes a clock tree synthesis (CTS) 108 operation, which may be performed in accordance with various embodiments described herein. The CTS 108 operation can generate a clock tree that delivers a clock signal from a clock tree root, which comprises a clock source of a circuit design, to a plurality of clock tree leaf nodes, which comprises a plurality of clock tree sinks within the circuit design. According to various embodiments, the clock tree restructuring is performed as a part of the CTS 108 operation that includes placing clock drivers at various regions of the IC design based on satisfaction of a set of clock tree design constraints, which can include slew, latency, and power consumption by the generated clock tree. Each clock tree driver delivers the clock signal to a set of clock sinks and/or a set of clock drivers. A clock net of the IC design describes interconnections between a clock driver and the clock sinks and drivers that are driven by the clock driver. Any one of the clock sources, sinks, and drivers may be referred to herein as a "clock instance."

An initial clock tree is constructed, for example, using the Steiner-tree approach. With the Steiner-tree approach, a minimum rectilinear Steiner tree (MRST) is used for routing a multi-pin clock net with minimum wire length. Given in points in the plane, an MRST connects all points by rectilinear lines, possibly via some extra points (called Steiner points), to achieve a minimum-wire-length tree of rectilinear edges. It shall be appreciated that the Steiner-tree approach is merely an example of the approach used to construct the initial clock tree, and in other embodiments, the computing device may utilize one of several known clock tree construction techniques to construct the initial clock tree.

As will be discussed further below, the initial clock tree may be iteratively refined as part of a clock tree restructuring process. As part of this process, a new potential location for each clock sink or group of clock sinks are determined and validated to verify it results in a timing delay reduction and conforms to timing-based design constraints. At each iteration, terminals of a clock instance (e.g., routed pins) are identified and an offset for each terminal is determined based on a distance between the terminal and a core route in the clock tree.

A target offset for moving the clock tree instance is determined based on a combination of terminal offsets, and the clock tree instance is moved toward the clock source. In this manner, the clock tree instance is moved from an initial location to a target location based on various factors that allow the timing delay to be improved. The clock tree is updated based on the new location of the clock instance by modifying the connected routes based on the new location (e.g., by shortening one or more routes).

Assuming a successful validation of the updated clock tree, the clock tree restructuring process may proceed to adjust a next clock tree instance in the clock tree, and a new location for the next clock tree instance is determined and validated in the same manner as described above. The process may be repeated until a new location has been tested for every clock tree instance in the clock tree.

Consistent with some embodiments, the clock tree restructuring process described above may be repeated in multiple passes such that the process is performed for each potential location for relocation of a clock sink or a group of clock sinks in a first pass, and the processes is subsequently performed to verify the adjusted relocation will or will not implicate various other portions of the design.

After design inputs are used in the design input 104 operation to generate a circuit layout, and any of the routing and optimization 106 operations are performed, a layout is generated in the layout instance 110. The layout describes the physical layout dimensions of the device that match the design inputs. Prior to this layout being provided to a fabrication 114 operation, the signoff 112 is performed on the circuit design defined by the layout.

After signoff verification by the signoff 112, a verified version of the layout is used in the fabrication 114 operation to generate a device, or additional testing and design updates may be performed using designer inputs or automated updates based on design simulation 116 operations or extraction, 3D modeling, and analysis 122 operations. Once the device is generated, the device can be tested as part of device test 120 operations, and layout modifications generated based on actual device performance.

A design update 118 from the design simulation 116; a design update 118 from the device test 120 or the extraction, 3D modeling, and analysis 122 operations; or the design input 104 operation may occur after the initial layout instance 110 is generated. In various embodiments, whenever design inputs are used to update or change an aspect of a circuit design, a timing analysis and the routing and optimization 106 operation may be performed.

Figure 2:
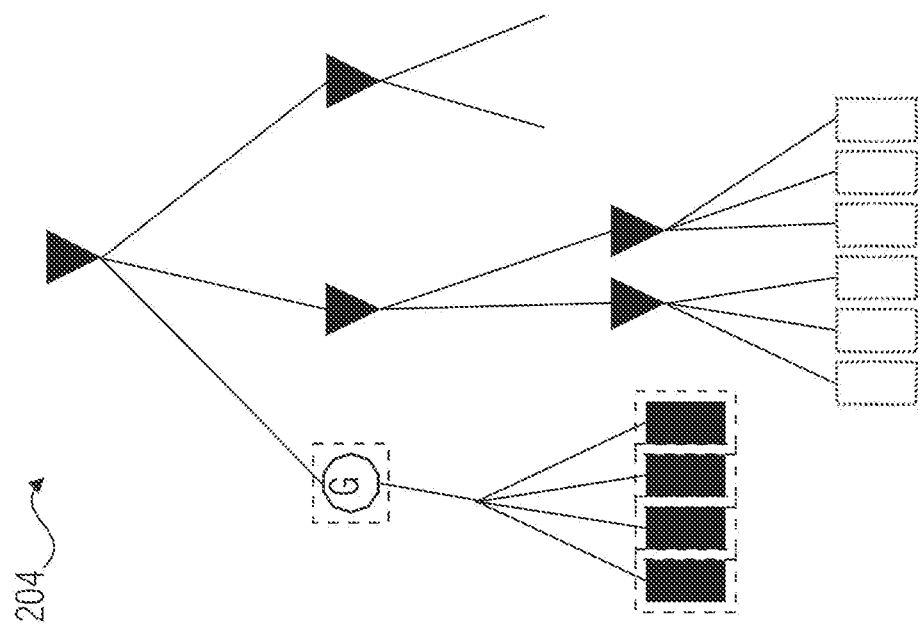
FIGS. 2-7 are diagrams that illustrate a clock tree and an updated clock tree based on restructuring in accordance with some embodiments.
Figure 2:
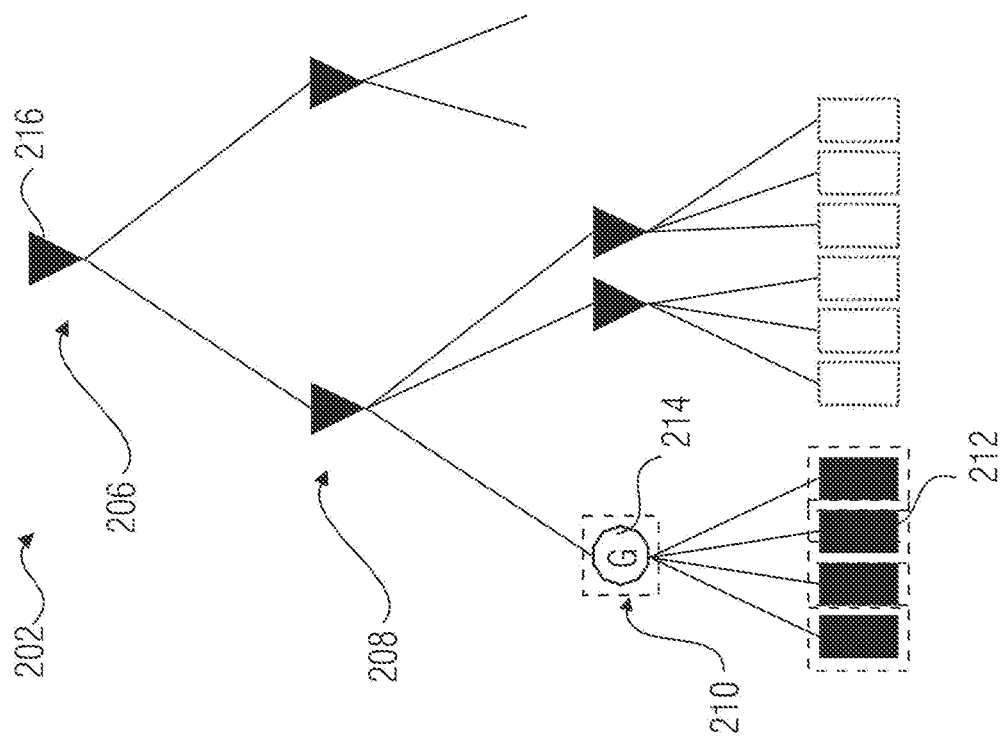

FIG. 2 is a diagram that illustrates an example segment of a clock tree and an updated clock tree based on restructuring in accordance with some embodiments. As used and described herein, a terminal may be described or referred to as a node. It is understood that a terminal and a node may be used interchangeably throughout this disclosure.

A first clock tree segment 202 includes several clock tree instances at various levels (e.g., first level 206, second level 208, third level 210) within the clock tree. The clock tree operates from the top down, meaning the timing delays increase at each level beneath the origination node 216 at the top of the clock tree. The origination node 216 is referred to herein as the clock source. In response to a request to reduce a timing delay, a group of clock tree instances (e.g., group 212) is identified for relocation from a third level 210 to a level higher than the third level 210. Group 212 is selected to be adjusted to the second level 208. In the example shown in FIG. 2, the terminal connecting the group of clock sinks is a clock gate 214. The entire group of clock sinks including the clock gate is selected to be reassigned to a higher node (e.g., node 214 of first level 206).

A second clock tree segment 204 illustrates the resulting portion of the clock tree after the restructuring has occurred. Group 212 has been pulled up to a higher level by the input terminal (e.g., clock gate 214). Various other configurations for adjusting timing delays are contemplated and described with respect to other examples herein such as those depicted in FIGS. 3-7.

Figure 3:
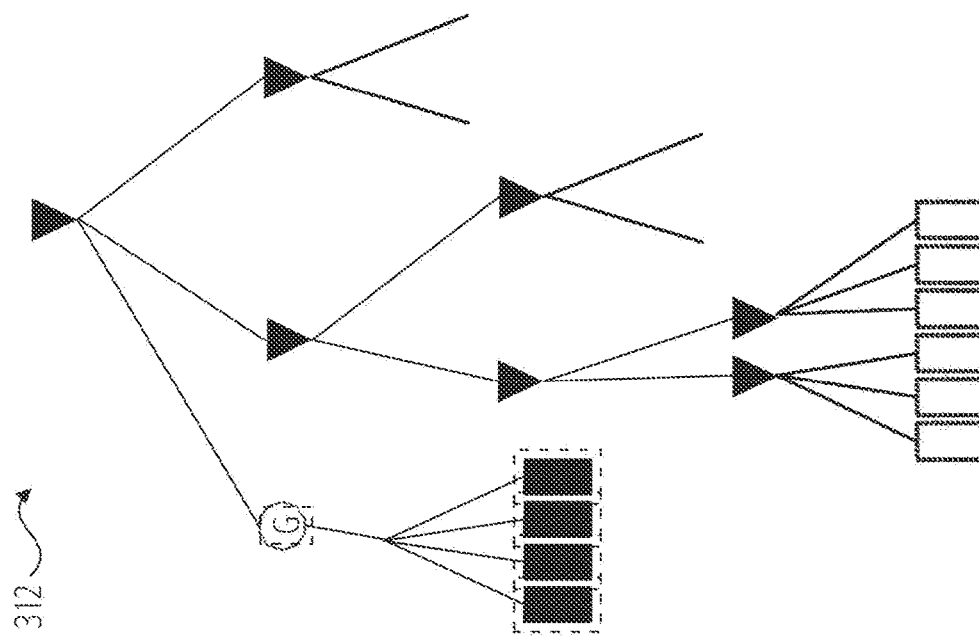
Figure 3:
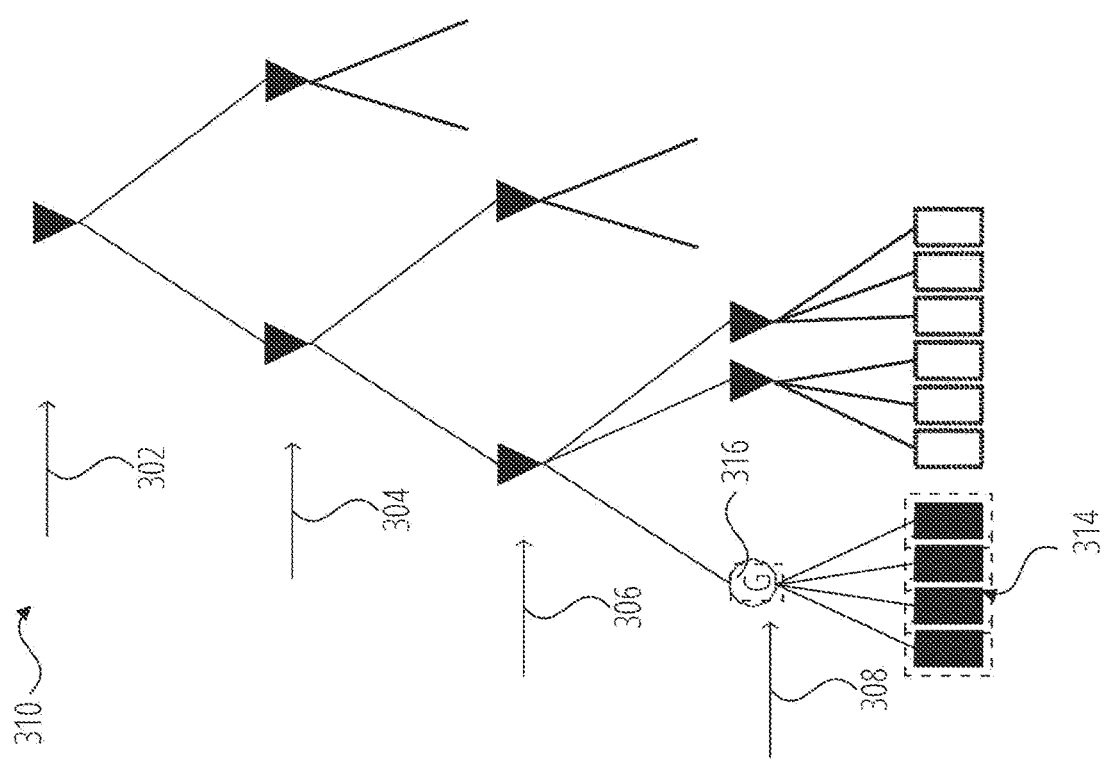

FIG. 3 is a diagram that illustrates a second example segment of a clock tree and an updated clod: tree based on restructuring in accordance with some embodiments. A third clock tree segment 310 includes several clock tree instances at various levels similar to the ones shown in FIG. 2. FIG. 3 includes levels 302, 304, 306, and 308. In some embodiments, a reduction in timing delay necessitates an identified clock group to be moved up toward the clock source by multiple levels to meet the timing requirements. As shown, group 314 is identified as the group of clock sinks to be relocated within the clock tree from level 308 (e.g., the bottom-most level).

The fourth clock tree segment 312 illustrates the resulting portion of the clock tree after the restructuring has occurred. Group 314 has been pulled up to a higher node by two levels (e.g., from 308 to 304). Similarly, to FIG. 2, group 314 has been pulled up to level 304 by the input terminal (e.g., clock gate 316).

Figure 4:
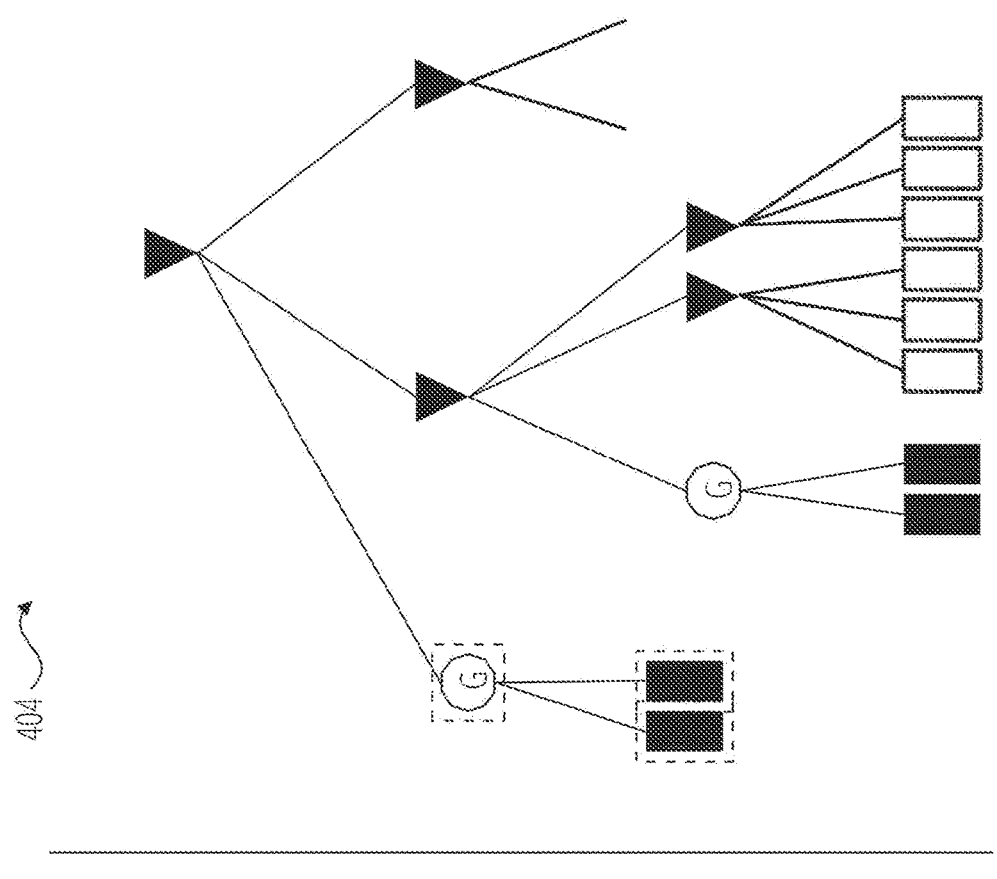
Figure 4:
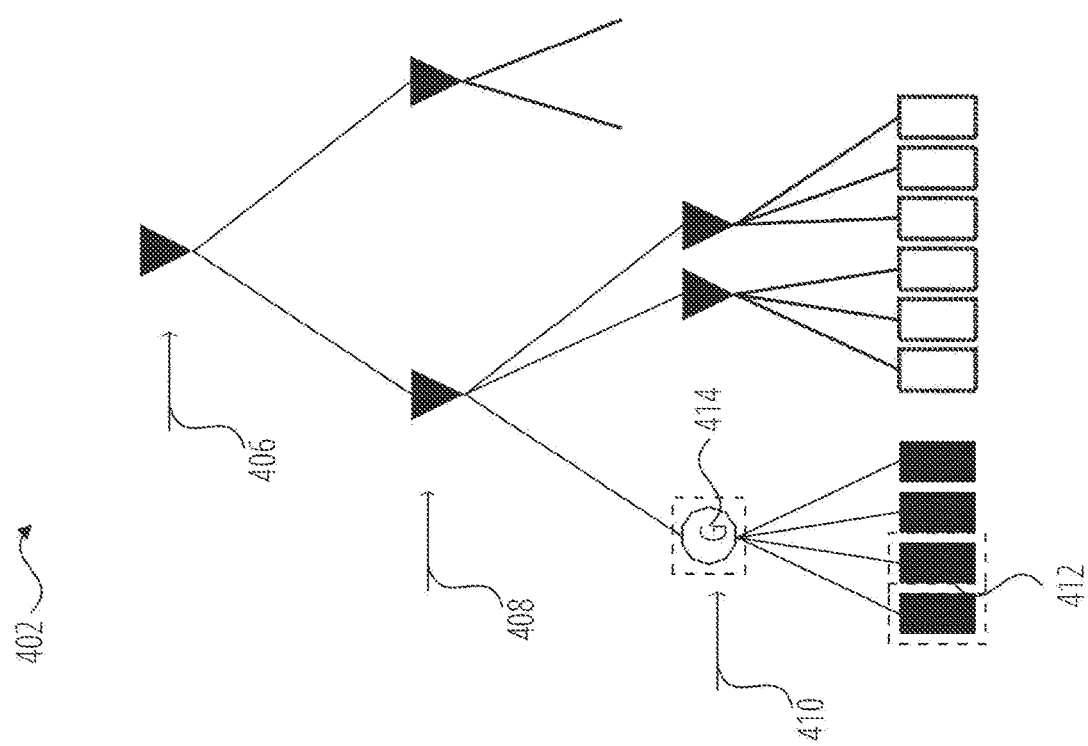

FIG. 4 is a diagram that illustrates a third example segment of a clock tree and an updated clock tree based on restructuring in accordance with some embodiments. A fifth clock tree segment 402 includes several clock tree instances at various levels (e.g., level 406, 408, 410). In some embodiments, the terminal 414 (input) of a group is cloned and a sub-group of clock sinks 412 is selected and relocated to a higher node along with the cloned input. As shown, group 412 of the fifth clock tree segment 402 includes an input clock gate. The clock gate is cloned, and a sub-group is selected for relocation. The remainder of the group of clock sinks remains at its original location. As shown in the sixth clock tree segment 404, sub-group 412 of the fifth clock tree was relocated to a higher level (e.g., level 408) along with the cloned clock gate 414. The rest of the clock tree instances of the group remain at level 410.

Figure 5:
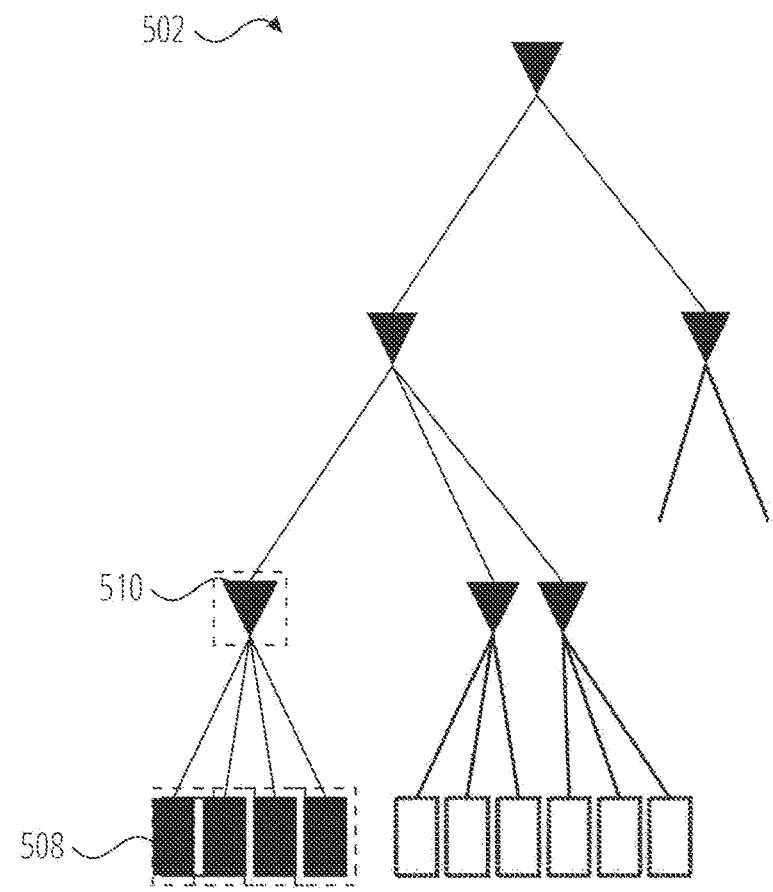
Figure 5:
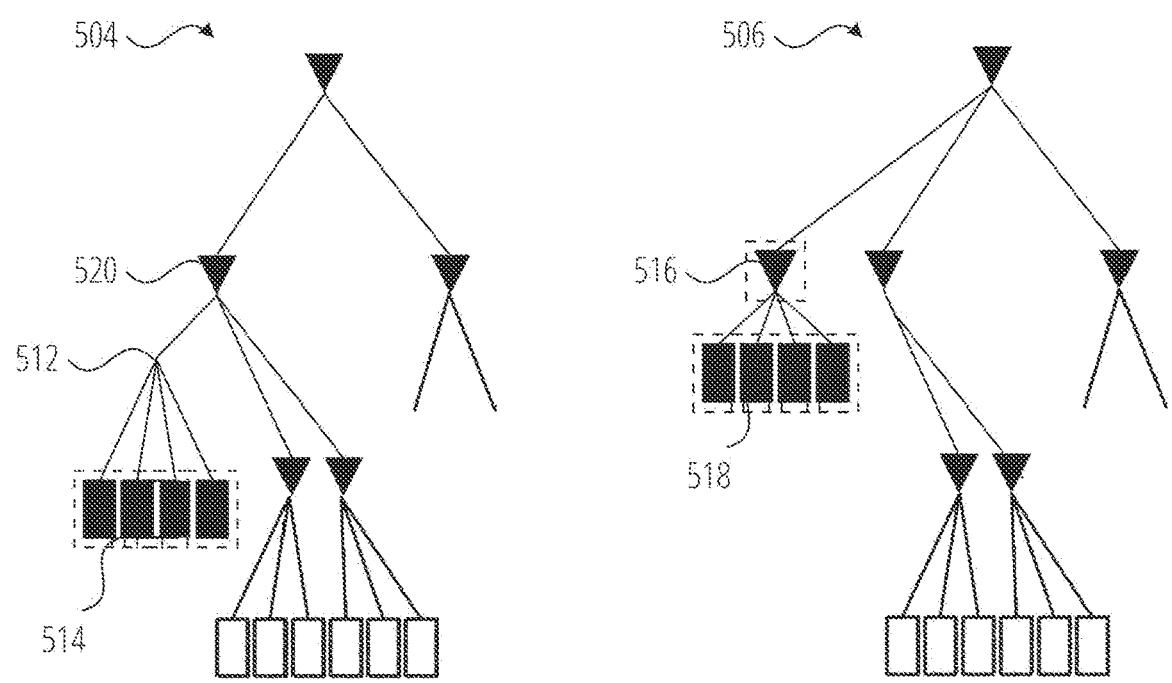

FIG. 5 is a diagram that illustrates a fourth example segment of a clock tree and an updated clock tree based on restructuring in accordance with some embodiments. An example clock tree diagram 502 identifies a group of clock tree instances to be restructured. In some embodiments, the methods and systems described herein provide multiple options for relocating the group that complies with the requested timing adjustment. A first option is described with reference to clock tree diagram 504 and a second option is described with reference to clock tree diagram 506.

Clock tree diagram 504 is an example restructured clock tree diagram where group 514 is essentially pulled up to a higher level by removing clock tree instance 510 and thus group 514 depends from clock tree instance 520. In this option, the leaf driver (e.g., clock tree instance 510) is deleted.

In another solution, clock tree diagram 506 relocates the group 508 including clock tree instance 510 to a higher node. In this option, the leaf driver (e.g., clock tree instance 510) is reparented, or reattached at a higher node. Although groups 508, 514, and 518 are numbered accordingly, it is understood that the groups themselves remain intact but the positioning within the clock tree may change.

Either of the options shown with regards to the example clock tree diagrams 504 or 506 can be implemented. Further selection or implementation of various variables may indicate a preference for restructuring the clock tree using the methods of one option over the other.

Figure 6:
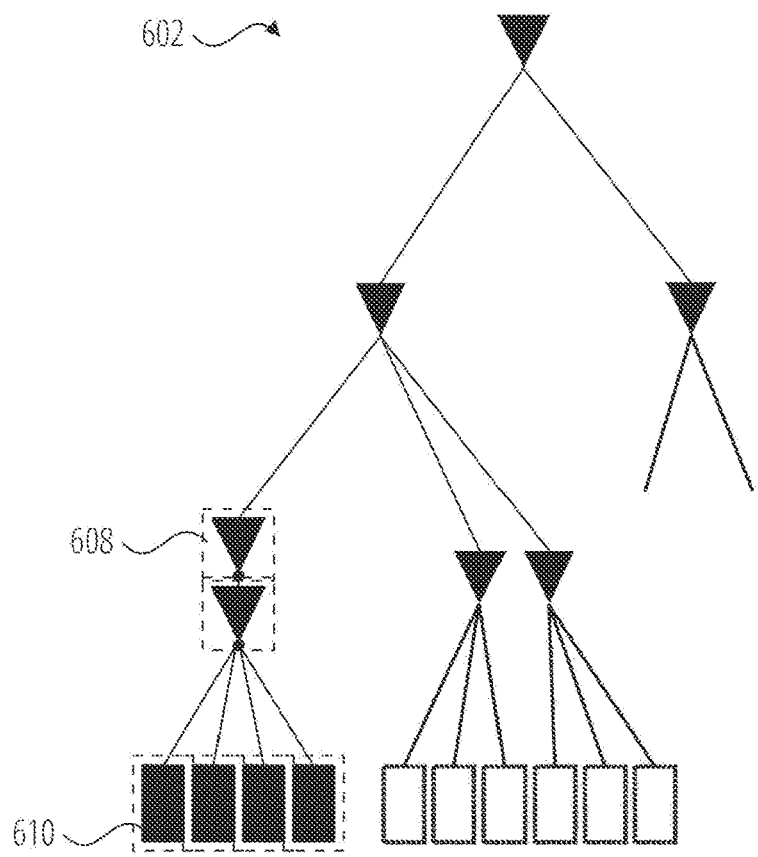
Figure 6:
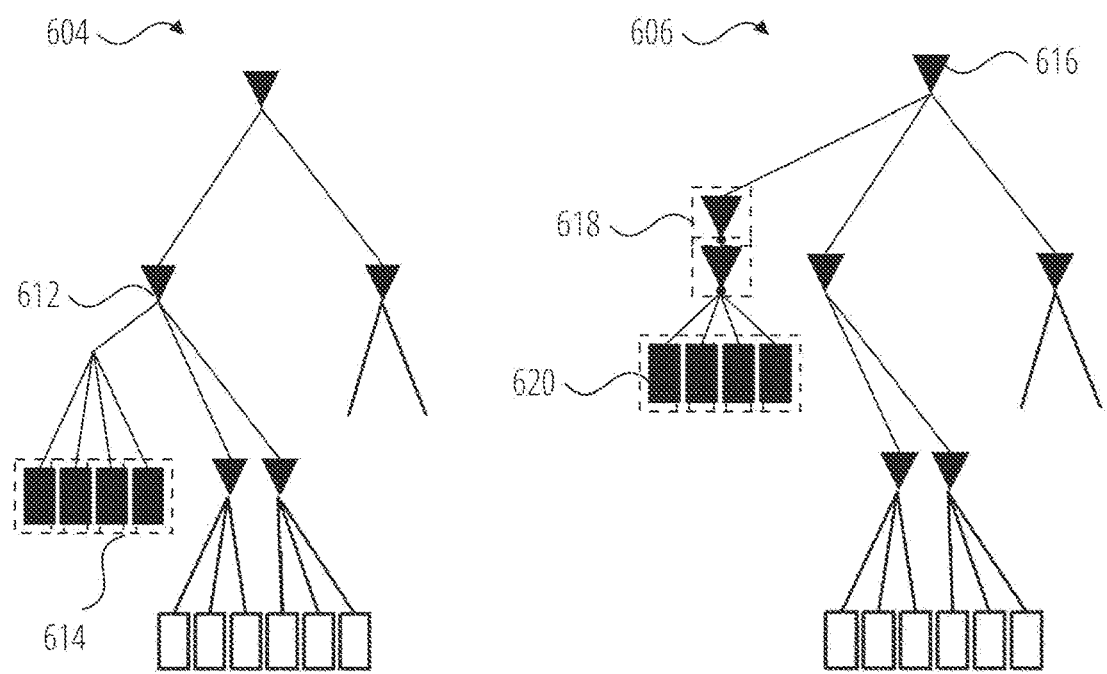

FIG. 6 is a diagram that illustrates a fifth example segment of a clock tree and an updated clock tree based on restructuring in accordance with some embodiments. An example clock tree diagram 602 includes an identified group of clock tree instances 610 to be restructured. In some embodiments, there are multiple options for relocating the identified group. A first option is described with reference to clock tree diagram 604 and a second option is described with reference to clock tree diagram 606.

The clock tree diagram 602 includes a pair of inverters 608 and group of clock tree instances 610. There are several options to restructure clock tree diagram 602 including deleting the inverter pair 608 or reparenting the top inverter.

The first option is described with reference to clock tree diagram 604. The pair of inverters 608 are deleted and the group of clock tree instances 610 become dependent from a higher node (e.g., node 612).

The second option is described with reference to clock tree diagram 606. The pair of inverters 608 and the group of clock tree instances are altogether restructured to depend from a higher node (e.g., node 618). Although as shown, node 616 is at a highest level within the visible clock tree diagram of 606. It is understood that the clock tree diagram 602, 604, and 606 may not show the entirety of the clock tree for the IC and is an example of a portion of the clock tree.

Although groups 610, 614, and 620 are numbered accordingly, it is also understood that the groups themselves remain intact but the positioning within the clock tree may change. Either of the options shown with regards to an example of clock tree diagrams 604 or 606 can be implemented. Further selection or implementation of various variables may indicate a preference for restructuring the clock tree using the methods of one option over the other.

Figure 7:
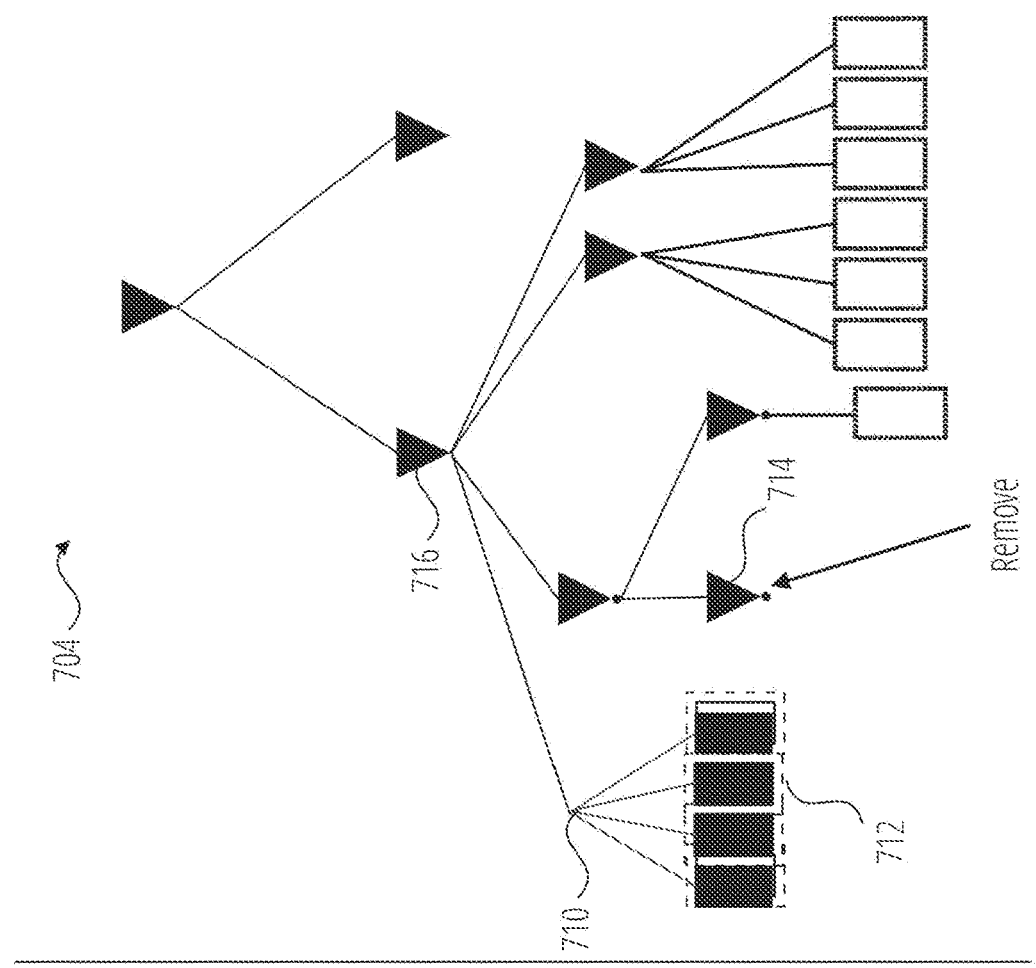
Figure 7:
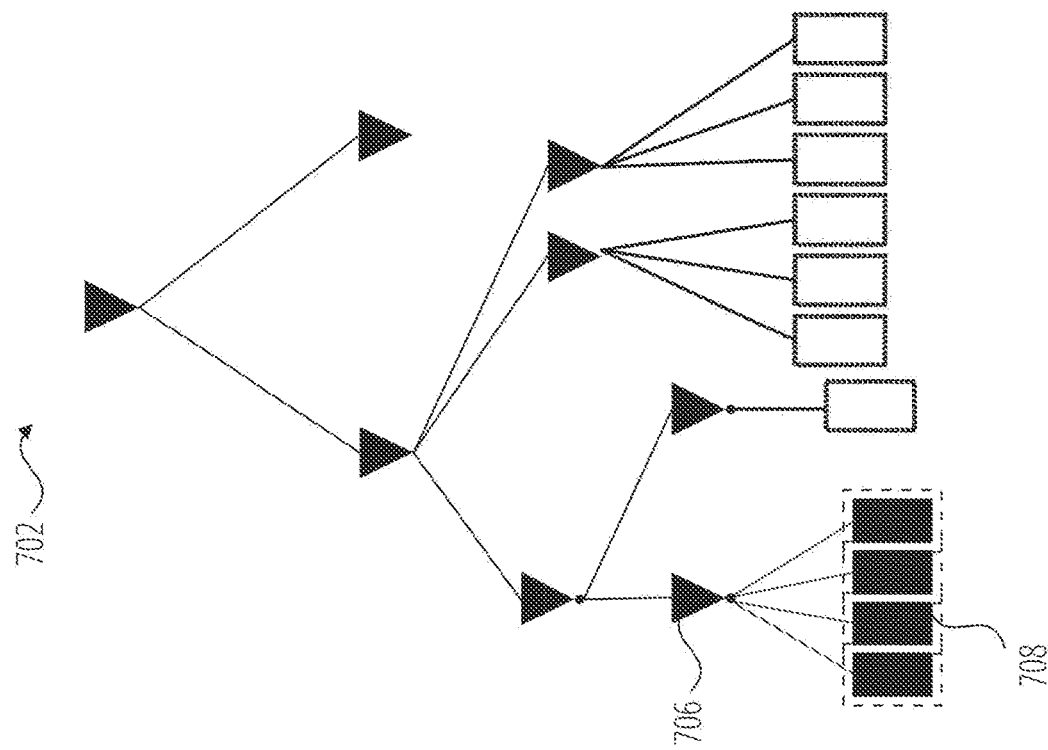

FIG. 7 is a diagram that illustrates a sixth example segment of a clock tree and an updated clock tree based on restructuring in accordance with some embodiments. An example of clock tree diagram 702 includes an identified group of clock tree instances 708 to be restructured. The group of clock tree instances 708 is restructured to depend from a higher node (e.g., node 716 of clock tree diagram 704). In some embodiments, the group of clock tree instances (e.g., 712) includes wire lengths that are connected to each other at node 710 and proceeds to be connected to a higher node 716. The physical location of the group of clock tree instance (e.g., 712) may not vary significantly, however, removal of a clock tree instance (e.g., node 706) may provide the necessary adjustment in timing delay. After the group of clock tree instances 708 has been relocated from node 706 to node 716, node 706 (e.g., node 714 of clock tree diagram 704) is not connected to anything. In such a case, the "dangling" node or pin is removed from the clock tree and in some embodiments, deleted from the design.

Figure 9:
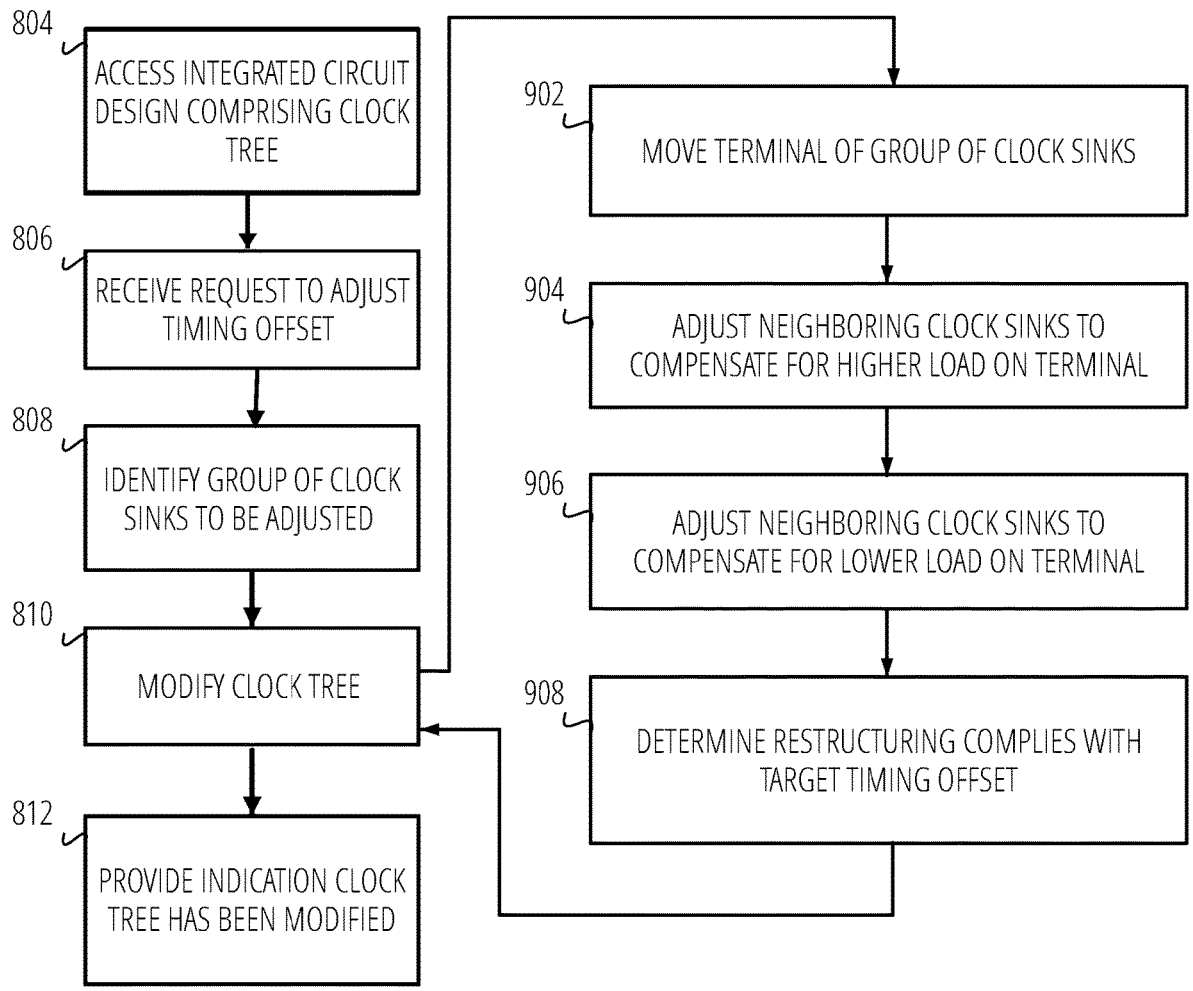

FIGS. 8-9 are flowcharts illustrating example methods for clock tree restructuring after Clock Tree Synthesis (CTS) in accordance with some embodiments. For some embodiments, the method 802 is performed as part of a post-CTS process applied to a circuit design (e.g., by an EDA software system).

It will be understood that the method 802 may be performed by a device, such as a computing device executing instructions of an EDA software system. For instance, the operations of a method 802 may be represented by executable instructions (e.g., EDA software) that, when executed by a processor of a computing device, cause the computing device to perform the method 802. Thus, an operation of the method 802 may be performed by a hardware processor (e.g., central processing unit or graphics processing unit) of a computing device (e.g., desktop, server, etc.). Accordingly, the method 802 is described below in reference to such a computing device.

Depending on the embodiment, an operation of the method 802 may be repeated in different ways or involve intervening operations not shown. Though the operations of the method 802 may be depicted and described in a certain order, the order in which the operations are performed may vary among embodiments, including performing certain operations in parallel.

The method 802 as illustrated begins at operation 804 where the computing device accesses integrated circuit design stored in a memory of the computing device. The integrated circuit design comprises a clock tree comprising one or more routes that interconnect a plurality of clock tree instances. Clock tree instances can include buffers, sinks, gates, inverters, and so on.

At operation 806, the computing device receives a request specifying an adjusted timing offset for the clock tree. For example, after CTS, a user requests that a specific timing criteria be met. The user may not know how to achieve this without expending precious time and resources in re-generating a new clock tree. In such a scenario, the user may request, after CTS, that an adjusted timing offset be met. In some embodiments, the adjusted timing offset is to reduce a delay time of the clock tree. In some embodiments, the adjusted timing offset is to increase a delay time of the clock tree.

The computing device identifies a group of two or more clock tree instances to be adjusted from the clock tree to comply with the request at operation 808. The computing device may determine a particular grouping of clock tree instances based on physical proximity, logical and electrical equivalence, and/or having a similar target insertion delay time. The target insertion delay time is calculated by subtracting the requested adjusted timing offset by the present or current timing. If two or more clock tree instances share a similar target insertion delay time, they may be subject to grouping.

At operation 810, the computing device restructures the clock tree by moving a terminal of the group of two or more clock tree instances from a first location to a second location of the clock tree to generate an updated clock tree. As shown in examples of FIGS. 2-7, a terminal or node of the group of instances is selected to be moved from a first location to a second location (typically to a higher level or position) within the clock tree.

In some embodiments, the terminal of the group is a clock gate (as seen in FIGS. 2-4). In accordance with some embodiments, the terminal of the group is an input pin of a buffer or an inverter of the clock tree (as seen in FIGS. 5 and 6). In accordance with some embodiments, the terminal of the group is a pin of the group of two or more clock tree instances (as seen in FIG. 7).

In accordance with some embodiments, the computing device generates a cloned version of the terminal of the group of clock tree instances and a subset of the group is moved to a second location in the clock tree along with the cloned version of the terminal. The remaining elements of the group of the clock tree instances are maintained at the first location within the clock tree (as seen in FIG. 4).

The computing device provides an indication that the updated clock tree has been generated and complies with the adjusted timing offset at operation 812.

FIG. 9 illustrates additional operations of method 802 in accordance with some embodiments. As shown in FIG. 9, method 802 may, in some embodiments, include operations 902, 904, 906, and 908. Consistent with these embodiments, the operations 902, 904, 906, and 908 may be performed preceding operation 812 where the computing device updates the clock tree.

At operation 902, the computing device moves a terminal of the group of clock tree instances (e.g., clock sinks). In performing the move, the computing device verifies that moving the clock tree instance results in the adjustment in delay time as requested. The computing device also validates that the updated clock tree does not violate any timing constraints and if the updated clock tree does violate timing constraints, the computing device performs operations 904 and/or 906. At operation 904, the computing device makes adjustments to neighboring clock instances (e.g., adjacent to or within five nodes) to compensate for a higher load on the target (e.g., second location). This may include inserting or removing buffers from the neighboring clock instances to compensate for the increased load.

The computing device may also adjust neighboring clock instances (e.g., clock sinks) to compensate for a lower load on the source (e.g., first location). This may include inserting or removing buffers from the neighboring clock instances to compensate for the decreased load.

At operation 908, the computing device determines that the modification of the clock tree complies with the requested timing offset. In some embodiments, the clock tree can be adjusted to a specific range within of the requested adjusted timing offset (e.g., +/−10%). After the determination has been made that the modification complies with the requested timing adjustment, the computing device keeps the updated clock tree and provides an indication that an updated clock tree has been generated that complies with the request. However, if the computing device determines that modification of the clock tree cannot be performed at least within a portion of the clock tree, the computing device may search for alternate locations within the clock tree to perform the modification. In some embodiments, the computing device may provide an indication that the clock tree cannot be modified according to the requested timing adjustment and revert to the original clock tree.

The method 802 may be iteratively repeated as needed within various locations of the clock tree to perform the requested timing adjustment.

Figure 10:
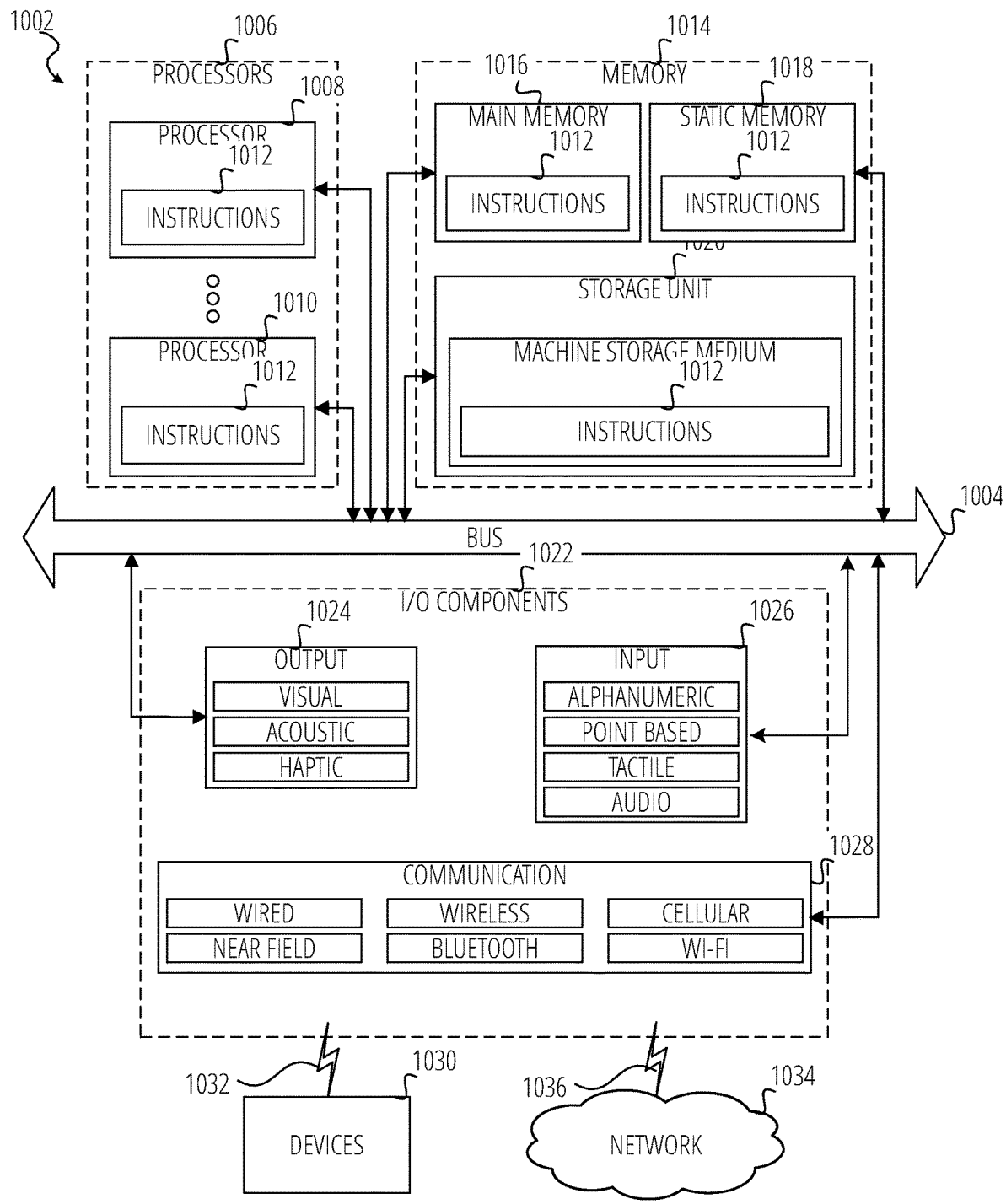
FIG. 10 illustrates a diagrammatic representation of a machine for carrying out the methods and operations described herein in accordance with some embodiments.

FIG. 10 illustrates a diagrammatic representation of a machine for carrying out the methods and operations described herein in accordance with some embodiments.

Machine 1002 is shown in the form of a computer system within which a set of instructions may be executed for causing the machine 1002 to perform any one or more of the methodologies discussed herein, according to an example embodiment. Specifically, FIG. 10 shows a diagrammatic representation of the machine 1002 in the example form of a computer system, within which instructions 1012 (e.g., software, a program, an application, an applet, an app, or other executable code) for causing the machine 1002 to perform any one or more of the methodologies discussed herein may be executed. For example, the instructions 1012 may cause the machine 1002 to execute an EDA software system that executes the method 802. Additionally, or alternatively, the instructions 1012 may implement FIGS. 1, 2-7, and 8-9. The instructions 1012 transform the general, non-programmed machine 1002 into a particular machine 1002 programmed to carry out the described and illustrated functions in the manner described here. In alternative embodiments, the machine 1002 operates as a standalone device or may be coupled (e.g., networked) to other machines. In a networked deployment, the machine 1002 may operate in the capacity of a server machine or a client machine in a server-client network environment, or as a peer machine in a peer-to-peer (or distributed) network environment. The machine 1002 may comprise, but not be limited to, a server computer, a client computer, a personal computer (PC), a tablet computer, a laptop computer, a netbook, a smart phone, a mobile device, a), a network router, a network switch, a network bridge, or any machine capable of executing the instructions 1012, sequentially or otherwise, that specify actions to be taken by the machine 1002. Further, while only a single machine 1002 is illustrated, the term "machine" shall also be taken to include a collection of machines 1002 that individually or jointly execute the instructions 1012 to perform any one or more of the methodologies discussed herein.

The machine 1002 may include PROCESSORS 1006, memory 1014, and I/O components 1050, which may be configured to communicate with each other such as via a bus 1002. In an example embodiment, the PROCESSORs 1006 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RTIC), another processor, or any suitable combination thereof) may include, for example, a processor 1012 and a processor 1014 that may execute the instructions 1012. The term "processor" is intended to include multi-core PROCESSORs 1006 that may comprise two or more independent processors (sometimes referred to as "cores") that may execute instructions contemporaneously. Although FIG. 10 shows multiple PROCESSORs 1006, the machine 1002 may include a single processor with a single core, a single processor with multiple cores (e.g., a multi-core processor), multiple processors with a single core, multiple processors with multiple cores, or any combination thereof.

The memory 1014 may include a main memory 1016, a static memory 1018, and a storage unit 1020, both accessible to the PROCESSORs 1006 such as via the bus 1004. The main memory 1016, the static memory 1018, and the storage unit 1020 store the instructions 1012 embodying any one or more of the methodologies or functions described herein. The instructions 1012 may also reside, completely or partially, within the main memory 1016, within the static memory 1016, within the storage unit 1020, within at least one of the PROCESSORs 1006 (e.g., within the processor's cache memory), or any suitable combination thereof, during execution thereof by the machine 1002.

The I/O components 1022 may include a wide variety of components to receive input, provide output, produce output, transmit information, exchange information, capture measurements, and so on. The specific I/O components 1022 that are included in a particular machine will depend on the type of machine. For example, portable machines such as mobile phones will likely include a touch input device or other such input mechanisms, while a headless server machine will likely not include such a touch input device. It will be appreciated that the I/O components 1022 may include many other components that are not shown in FIG.

10. The I/O components 1022 are grouped according to functionality merely for simplifying the following discussion and the grouping is in no way limiting. In various example embodiments, the I/O components 1022 may include output components 1024 and input components 1026, The output components 1024 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1022 may include communication components 1028 operable to couple the machine 1002 to a network 1034 or devices 1030 via a coupling 1036 and a coupling 1032, respectively. For example, the communication components 1028 may include a network interface component or another suitable device to interface with the network 1034. In further examples, the communication components 1028 may include wired communication components, wireless communication components, cellular communication components, and other communication components to provide communication via other modalities. The devices 1030 may be another machine or any of a wide variety of peripheral devices (e.g., a peripheral device coupled via a universal serial bus (USB)).

Executable Instructions and Machine Storage Medium

The various memories (e.g., 1016, 1018, 1020, and/or memory of the processor(s) 1006) and/or the storage unit 1020 may store one or more sets of instructions and data structures (e.g., software) embodying or utilized by any one or more of the methodologies or functions described herein. These instructions, when executed by the processor(s) 1006, cause various operations to implement the disclosed embodiments.

As used herein, the terms "machine-storage medium," "device-storage medium," and "non-transitory computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1034 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1034 or a portion of the network 1034 may include a wireless or cellular network, and the coupling 1036 may be a Code Division Multiple Access (CDMA) connection, a Global System for Mobile communications ((SM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LIE) standard, others defined by various standard-setting organizations, other long-range protocols, or other data transfer technology.

The instructions 1012 may be transmitted or received over the network 1034 using a transmission medium via a network interface device (e.g., a network interface component included in the communication components 1028) and utilizing any one of a number of well-known transfer protocols (e.g., hypertext transfer protocol (HTTP)). Similarly, the instructions 1012 may be transmitted or received using a transmission medium via the coupling 1032 (e.g., a peer-to-peer coupling) to the devices 1030. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1012 for execution by the machine 1002, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended: that is, a system, device, article, or process that includes elements in addition to those listed after such a term in a claim is still deemed to fall within the scope of that claim.

What is claimed is:

1. A system comprising:
    one or more processors; and
    a memory storing instructions that, when executed by the one or more processors, cause the system to perform operations comprising:
    accessing an integrated circuit design stored in memory, the integrated circuit design comprising a clock tree that includes routes that interconnect a clock source to a plurality of clock sinks;
    receiving a request to adjust a present timing offset of the clock tree to a target timing offset;
    identifying, from the clock tree, a group of clock sinks to be adjusted to satisfy the request;
    modifying the clock tree by moving a terminal of the group from a first location in the clock tree to a second location in the clock tree to generate an updated clock tree; and
    providing an indication that the updated clock tree has been modified and complies with the target timing offset.

2. The system of claim 1, wherein moving the terminal of the group from the first location in the clock tree to a second location in the clock tree advances the group of clock sinks to the second location in the clock tree, the second location in the clock tree is at a location closer to the clock source than the first location.

3. The system of claim 1, wherein each clock sink of the group of clock sinks has a signal that is logically and electrically equivalent to signals of all other clock sinks of the group of clock sinks.

4. The system of claim 1, wherein the terminal of the group of clock sinks is a pin of the group of clock sinks.

5. The system of claim 1, wherein the terminal of the group of clock sinks is an input pin of a buffer of the clock tree.

6. The system of claim 1, wherein the terminal of the group of clock sinks is an input pin of an inverter of the clock tree.

7. The system of claim 1, further comprises generating a cloned version of the terminal of the group of clock sinks.

8. The system of claim 7, further comprises moving the cloned version of the terminal and a sub-group of the group of clock sinks to the second location and maintaining a remainder of the group at the first location.

9. The system of claim 1, wherein modifying the first clock sink further comprises modifying the first clock sink of the group of clock sinks by:
    adjusting one or more clock sinks within a specified radius of the group to compensate for a higher load on a terminal of the first clock tree.

10. The system of claim 1, wherein modifying the first clock sink further comprises modifying the first clock sink of the group of clock sinks by:
    adjusting one or more clock sinks within a specified radius of the group of clock sinks to compensate for a lower load on a source of the first clock tree.

11. The system of claim 1, wherein modifying the first clock sink further comprises modifying the first clock sink of the group of clock sinks by:
    removing dangling pins from the first location of the group of clock sinks.

12. A method, comprising:
    accessing an integrated circuit design stored in memory, the integrated circuit design comprising a clock tree that includes routes that interconnect a clock source to a plurality of clock sinks;
    receiving a request to adjust a present timing offset of the clock tree to a target timing offset;

identifying, from the clock tree, a group of clock sinks to be adjusted to satisfy the request;

modifying the clock tree by generating a cloned version of a terminal of the group of clock sinks and moving the cloned version of the terminal including a sub-group of the clock sinks from a first location in the clock tree to a second location in the clock tree and maintaining a remainder of the group of clock sinks at the first location to generate an updated clock tree; and providing an indication that the updated clock tree has been modified and complies with the target timing offset.

13. The method of claim 12, wherein moving the terminal of the cloned version from the first location in the clock tree to a second location in the clock tree advances the cloned version to the second location in the clock tree, the second location in the clock tree is at a location closer to the clock source than the first location.

14. The method of claim 12, wherein each clock sink of the group of clock sinks has a signal that is logically and electrically equivalent to signals of all other clock sinks of the group of clock sinks.

15. The method of claim 12, wherein the terminal of the group of clock sinks of clock sinks is a pin of the group of clock sinks.

16. The method of claim 12, wherein the terminal of the group of clock sinks is an input pin of a buffer of the clock tree.

17. The method of claim 12, wherein the terminal of the group of clock sinks is an input pin of an inverter of the clock tree.

18. The method of claim 12, wherein modifying the first clock sink further comprises modifying the first clock sink of the group of clock sinks by:
adjusting one or more clock sinks within a specified radius of the group of clock sinks to compensate for a higher load on a terminal of the first clock tree.

19. The method of claim 12, wherein modifying the first clock sink further comprises modifying the first clock sink of the group of clock sinks by:
adjusting one or more clock sinks within a specified radius of the group of clock sinks to compensate for a lower load on a source of the first clock tree.

20. A non-transitory computer-readable medium storing instructions that, when executed by one or more processors, cause the one or more processors to perform operations comprising:

accessing an integrated circuit design stored in memory, the integrated circuit design comprising a clock tree that includes routes that interconnect a clock source to a plurality of clock sinks;

receiving a request to adjust a present timing offset of the clock tree to a target timing offset;

identifying, from the clock tree, a group of clock sinks to be adjusted to satisfy the request;

modifying the clock tree by relocating at least a portion of the group of clock sinks from a first location in the clock tree to a second location in the clock tree to generate an updated clock tree; and providing an indication that the updated clock tree has been modified and complies with the target timing offset.

\* \* \* \* \*